(12) United States Patent
Shiraishi et al.

(10) Patent No.: US 7,918,488 B2
(45) Date of Patent: Apr. 5, 2011

(54) DISK CHUCKING MECHANISM AND DISK HANDLING ROBOT

(75) Inventors: Toshimitsu Shiraishi, Ashigarakami-gun (JP); Fujio Yamasaki, Ashigarakami-gun (JP); Yoshinori Tokumura, Ashigarakami-gun (JP)

(73) Assignee: Hitachi High-Technologies Corporation, Tokyo (JP)

( * ) Notice: Subject to any disclaimer, the term of this patent is extended or adjusted under 35 U.S.C. 154(b) by 499 days.

(21) Appl. No.: 12/121,144

(22) Filed: May 15, 2008

(65) Prior Publication Data
US 2008/0288968 A1    Nov. 20, 2008

(30) Foreign Application Priority Data
May 16, 2007   (JP) .................. 2007-130301

(51) Int. Cl.
*B25J 15/08* (2006.01)
(52) U.S. Cl. .............. 294/103.1; 294/86.4; 294/99.1; 294/104; 414/941
(58) Field of Classification Search ............... 294/86.4, 294/88, 93, 99.1, 103.1, 104, 119.1, 902; 414/935–941
See application file for complete search history.

(56) References Cited

U.S. PATENT DOCUMENTS

| | | | | |
|---|---|---|---|---|
| 5,022,695 A | * | 6/1991 | Ayers | 294/88 |
| 5,934,865 A | * | 8/1999 | Meadows | 414/796.9 |
| 5,936,931 A | * | 8/1999 | Kobayashi et al. | 294/103.1 |
| 5,938,902 A | * | 8/1999 | Nguyen et al. | 204/298.15 |
| 6,155,773 A | * | 12/2000 | Ebbing et al. | 414/744.5 |
| 6,481,770 B2 | * | 11/2002 | Tholander et al. | 294/100 |
| 6,491,330 B1 | * | 12/2002 | Mankame et al. | 294/88 |
| 7,140,655 B2 | * | 11/2006 | Kesil et al. | 294/104 |

FOREIGN PATENT DOCUMENTS
JP   9-274779   10/1997
* cited by examiner

*Primary Examiner* — Dean J Kramer
(74) *Attorney, Agent, or Firm* — Mattingly & Malur, P.C.

(57) ABSTRACT

A disk chucking mechanism constructed with first, second and third link members forms a slider crank mechanism and the third link member is rotated by a drive of a forward/rearward actuator such as an air cylinder and chucking nails are provided which protrude perpendicularly to a longitudinal direction of the first or second link member. A rotation of the chucking nail protruded perpendicularly is stopped by engagement with a disk and a spring member is bent by further forward or rearward movement of the second link member to energize a first chucking nail in a direction for maintaining an engagement with the disk. The disk is chucked with a predetermined force by only the drive of the forward/rearward actuator.

9 Claims, 4 Drawing Sheets

DISK CHUCKING MECHANISM AND DISK HANDLING ROBOT

TECHNICAL FIELD

This invention relates to a disk chucking mechanism and a disk handling robot and, in particular, this invention relates to a magnetic disk chucking mechanism which can reduce the damage of a disk when a magnetic disk or a substrate thereof is taken from a cassette or stored in the cassette and which is able to chuck or release the disk at high speed and is suitable for chucking a disk having a glass substrate.

BACKGROUND ART

It is required to increase the memory density of a magnetic disk used as an information recording medium of such as a computer and, recently, the magnetic disk is miniaturized by using a glass disk as a substrate.

The hard disk drive device (HDD) has been used in the fields of automobile products, consumer electrical appliances and audio products, and a hard disk drive device using disks of 2.5 inches, 1.8 inches, 1.0 inch or smaller is installed in various products.

There is a tendency towards miniaturization of the hard disk drive device and the unit cost of the hard disk drive device is reduced. Therefore, the manufacturers are required to manufacture a large number of hard disk drive devices with low cost. Therefore, in even the disk cleaning device and the disk tester, there is a requirement of efficient cleaning, drying and testing of a large number of disks and there is a requirement of miniaturization.

The transportation of a magnetic disk or a substrate thereof (referred to as "disk", hereinafter) to respective stages of such as cleaning, drying and testing or from those stages is usually performed through a handling mechanism such as a disk handling robot. A disk chucking mechanism is provided in a hand portion provided on a top end side of the disk handling robot and a disk held by the disk chucking mechanism is transported to or taken from a cassette.

As a disk chucking mechanism of this kind, a disk handling mechanism for chucking an inner periphery and an outer periphery of a disk is disclosed in JP-A-09-274779.

The chucking mechanism disclosed in JP-A-09-274779 includes three rollers each having a V-groove and a disk is chucked at two outer peripheral points and at a point of an inner periphery thereof. In this chucking mechanism, a swing mechanism in which a roller arm having a V-groove on the inner peripheral chucking side is rotated by 90° and protrudes on the inner peripheral side of the disk is employed.

In order to improve the manufacturing efficiency and the testing efficiency of a disk, the efficiency of the disk handling processing is very important. That is, when the transporting speed of a disk is increased in order to improve the efficiencies, the dropping of a disk and/or contact between disks during the transportation may occur unless the disk chucking is reliable. On the other hand, when the chucking force of the chucking mechanism is increased in order to make the disk chucking reliable, chucking mark and/or cracking or chipping of a chamfer portion of the disk tend to occur. Particularly, when the high speed chucking is performed for a disk having a glass substrate, the chamfer portion of the disk tends to be cracked or made flawed.

Usually, the chucking force required in disk handling is several tens to several hundreds of grams. In the disk chucking mechanism disclosed in JP-A-09-274779, the opening and closing of the chuck is performed by a slow drive of an air cylinder in order to reduce the damage of the disk. In order to chuck the disk reliably and stably with such force, it is necessary to feed air to a cylinder slowly to operate the chuck slowly. Therefore, there is a problem that the open/close of the chuck takes a time.

In order to reduce the damage of the disk by the chuck and shorten the chucking time, it is possible to use a vacuum adsorption chuck. In such case, however, there is another problem that, unless an adsorption head having a configuration corresponding to an outer configuration of a disk to be adsorbed is prepared, the adsorption becomes unstable. Further, the vacuum adsorption becomes unstable due to size error caused by variation of disks and positioning error of the disk handling robot and there is a problem of dropping of the disk from the chucking mechanism during the handling or during the transportation of the disk.

SUMMARY OF THE INVENTION

An object of the present invention is to provide a disk chucking mechanism with which the damage of magnetic disks or substrates thereof is reduced and high speed chucking and/or opening of the disks can be realized.

Another object of this invention is to provide a disk handling robot having a disk chucking mechanism in which the chuck open/close time is shortened.

A still further object of this invention is to provide a disk handling robot having a disk chucking mechanism suitable for chucking a disk of a glass substrate.

In order to achieve these objects, the disk chucking mechanism or the disk handling robot of this invention is featured by comprising a movement actuator (a forward/rearward moving actuator), a first link member, a second link member which is arranged along a longitudinal direction of the first link member and moved rearward or forward relatively along the longitudinal direction of the first link member by the movement actuator, a third link member connected to end portions of the first and second link members, a first chucking nail provided on the third link member and rotated according to a rotation of the third link member and a spring member which is provided on the second link member and bent correspondingly to the forward or rearward movement, wherein a force for further rotating the third link member in the same direction is generated in the spring member by rotating the third link member by a forward or rearward movement of the second link member to protrude the first chucking nail in a direction perpendicular to the longitudinal direction of the first or second link member to thereby couple the nail with an inner or outer periphery of the disk.

In this invention, since the link mechanism constructed with the first, second and third link members forms a slider crank mechanism, the third link member is rotated by the drive of the actuator such as an air-cylinder, the chucking nail provided on the third link member protrudes perpendicularly to the longitudinal direction of the first or second link member. When the chucking nail engages with the disk, the rotation of the chucking nail protruded perpendicularly is stopped and the rotation of the third link member is also stopped. Therefore, it is possible to bend the spring member by further rearward or forward movement of the second link member. Due to this bending, it is possible to energize the first chucking nail such that the first chucking nail is rotated in the direction in which the engagement of the disk is maintained.

Therefore, it becomes possible to chuck the disk with a predetermined force by only driving the actuator rearward or forward.

In this case, the force for chucking the disk is determined by elasticity of the spring (elastic constant) and bending amount thereof and it is possible to set the force to a substantially constant value.

As a result, the disk chucking mechanism of this invention can easily select the chucking force with respect to the disk in a range from several tens grams to several hundreds of grams. Further, the open/close operation of the chuck can be done by only forward/rearward drive of the actuator. Therefore, the disk chucking mechanism of this invention can reduce the damage of the disk when the disk is chucked and shorten the open/close time of the disk chucking by selecting an optimum chucking force correspondingly to the energizing force of the spring member.

DESCRIPTION OF THE PREFERRED EMBODIMENTS

Figure 1:
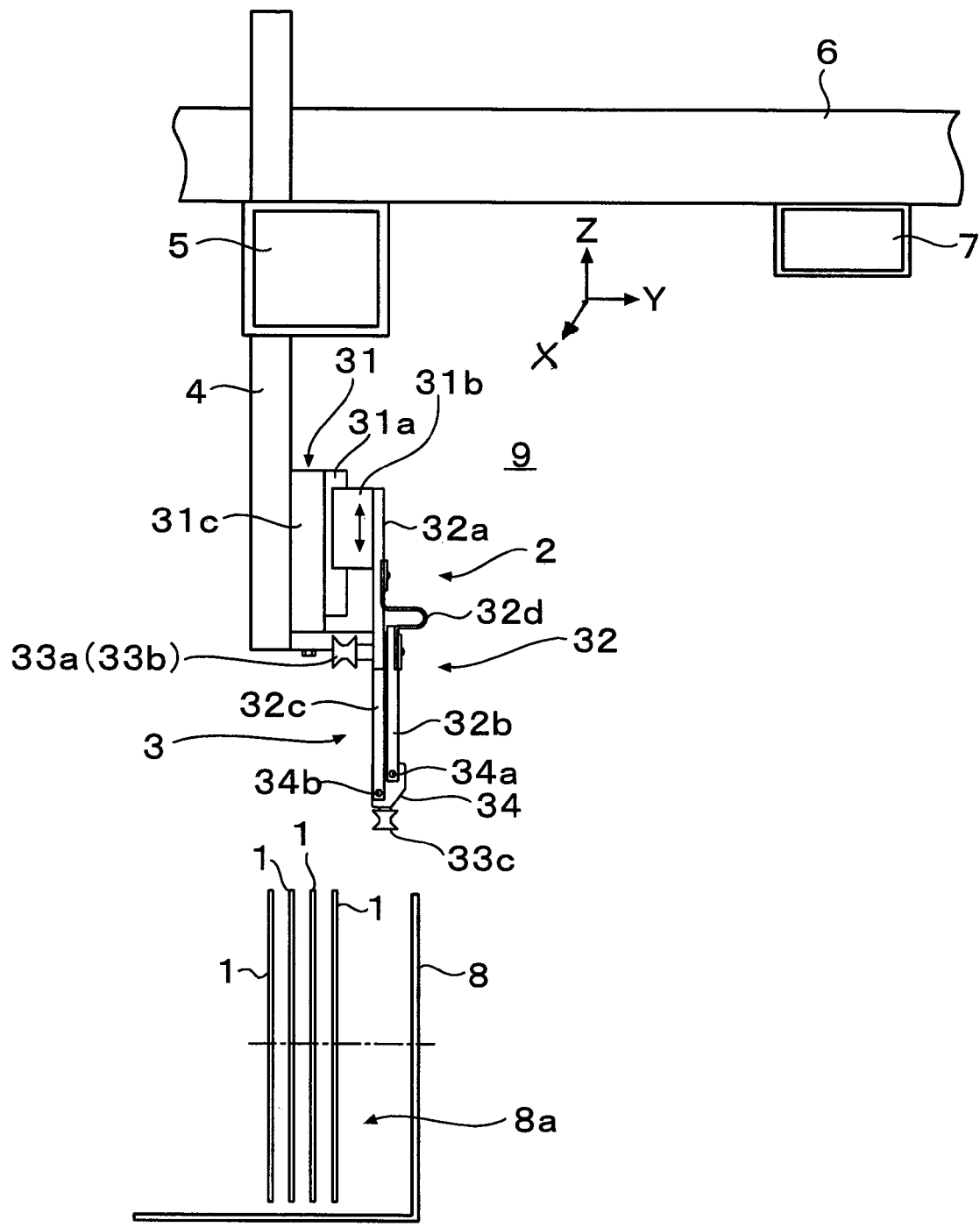
FIG. 1 shows an embodiment of the disk chucking mechanism of this invention.

In the drawings, the same constructive elements are depicted by the same numerals.

In FIG. 1, reference number 1 depicts a disk, 9 a handling robot having an arm movable in X, Y and Z directions.

The handling robot 9 has a hand 2 which chucks the disk 1 having a center opening at an inner periphery point of the opening and two outer peripheral points of the disk. The hand 2 is suspended from the handling robot 9 by an arm 4 and constitutes a disk chucking mechanism 3. An elevator mechanism 5 of the handling robot 9 is fixed on a rail 6 and elevates the arm 4 in the Z direction. The rail 6 includes a Y axis moving mechanism for the elevator mechanism 5 and is moved in the X direction by an X axis moving mechanism 7. A reference numeral 8 depicts a disk cassette positioned below the hand 2 and storing a plurality of disks 1.

The disk chucking mechanism 3 of the hand 2 includes an air cylinder 31 having a linear guide and provided vertically, a finger portion 32 and a bracket link 34 which is a plate member and corresponds to a third link member of this invention. The air cylinder 31, the finger 32 and the bracket link 34 constitute a slider crank mechanism.

The finger portion 32 includes a first finger 32a which is a rod member, a second finger 32b which is a rod member and corresponds to the second link member of this invention, a third finger 32c which is a rod member and corresponds to the first link member of this invention and a U-shaped leaf spring 32d. The second finger 32b extends along a longitudinal direction of the third finger 32c.

The air cylinder 31 includes a rail 31a for a linear guide and a movable table 31b and is fixed to the arm 4 through a fixed base 31c. The rail 31a is mounted along the arm 4 and moved together with the arm 4 vertically by the elevator mechanism 5.

The movable table 31b moves on the rail 31a of the air cylinder 31. The first finger 32a is fixed to the movable table 31b so that the first finger 32a is moved vertically (Z direction) by the air cylinder 31.

Figure 3A:
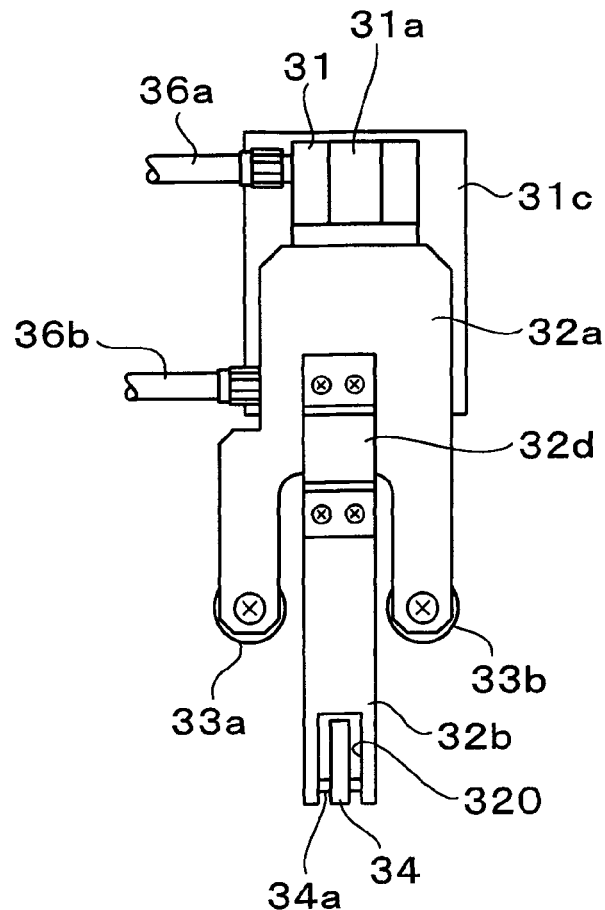
FIG. 3(a) shows a rear side of the disk chucking mechanism and FIG. 3(b) shows a link coupling ware for coupling constructive members of the disk chucking mechanism.

As shown in FIG. 3(a) which shows a rear side of the hand 2 looked at from the right side of FIG. 1, a top end of the first finger 32a is bifurcated into two portions and V-grooved rollers 33a and 33b are provided in the two portions, respectively. As shown in FIG. 1, the rollers 33a and 33b protrude in a horizontal direction and one end portion of the leaf spring 32d is fixed to the first finger 32a. The second finger 32b is fixed to the other end portion of the leaf spring 32d so that the second finger 32b is suspended from the leaf spring 32d as shown in FIG. 1. The top portions of the first finger 32a are positioned on both sides of the second finger 32b.

Incidentally, FIG. 3(a) shows the air cylinder 31 which is driven forward from the state shown in FIG. 1 and the movable table 31b is moved forward. By this forward movement of the movable table 31b, the second finger 32b is lowered and, in FIG. 3(a), it overlaps on the behind of the third finger 32c. FIG. 1 shows an initial state before the air cylinder 31 is driven forward, in which the top portion of the third finger 32c is positioned below the top end portion of the second finger 32b and the roller 33c (corresponding to the chucking nail of this invention) mounted on the bracket link 34 is directed downward.

In FIGS. 1 and 3(a), a rectangular recess 320 is provided in the top end portion of the second finger 32b which is opposite to the rear end portion of the leaf spring 32d. An end portion of the bracket link 34 is inserted into the recess 320 and is rotatably supported by the top end portion of the second finger 32b through a pin 34a such that it and the bracket link 34 are linked.

Figure 2:
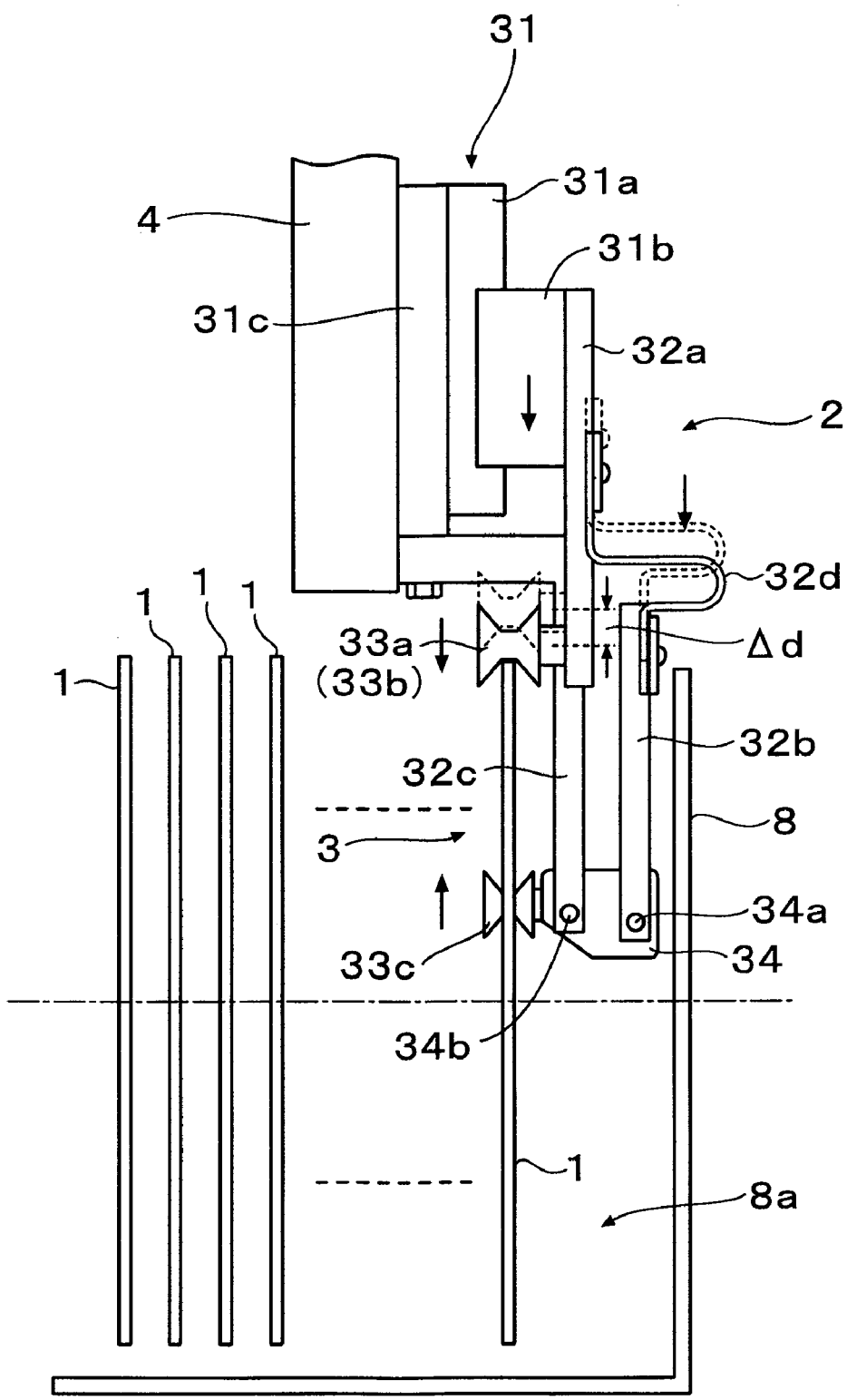
FIG. 2 illustrates a disk chucking state within a disk cassette of the disk chucking mechanism shown in FIG. 1.

As shown in FIGS. 1 and 2, the third finger 32c is cranked from the vertical direction to a horizontal direction and the rear end portion thereof is bolted to the fixed base 31c of the air cylinder 31. The portion of the third finger 32c, which is cranked vertically, extends along the second finger 32b and the top end portion thereof is supported by the bracket link 34 through the pin 34b, thus, the bracket link 34 is swingably linked with the third finger 32c.

Incidentally, a groove similar to the recess groove 320 is provided in the top end portion of the third finger 32c. Since the linking between the top end portion of the third finger 32c and the bracket link 34 is the same as that of the top end portion of the second finger 32b, detailed description thereof is omitted.

In FIG. 3(a), reference numerals 36a and 36b depict tubes for guiding air to the air cylinder 31, which supply air for moving the movable table 31b to the air cylinder 31.

Figure 3B:
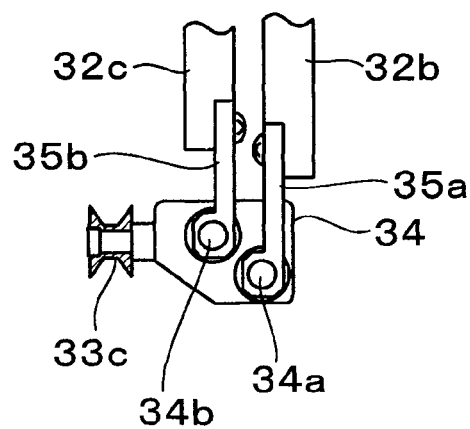

FIG. 3(b) shows a simpler linking structure for linking the second finger 32b and the third finger 32c and the bracket link 34 by means of a linking metal ware.

The bracket link 34 and the second and third fingers 32b and 32c are linked by linking metal wares 35a and 35b mounted on the first finger 32a and the second finger 32b rotatably supported by pins 34a and 34b. The roller 33c with a V-groove provided on the top end side of the bracket link 34 is mounted on the bracket link 34 such that, when the bracket link 34 is rotated clockwise by 90°, it protrudes perpendicularly to the longitudinal direction of the second finger 32b and the third finger 32c. Incidentally, FIG. 3(b) shows a state corresponding to FIG. 2 in which the movable table 31b is moved forward and the bracket link 34 is rotated by 90°.

In the FIG. 3(b), each of the linking metal wares 35a and 35b has a cantilever structure. However, it is possible to construct them by providing a linking metal ware on the opposite side and supporting the opposite ends of the pins 34a and 34b by the linking metal wares as in the structure shown in FIG. 3(a).

The diameter of the roller 33c which engages with the inner periphery of the disk 1 is smaller than those of the rollers 33a and 33b which engage with the outer periphery of the disk 1 depending upon a difference between the inner peripheral diameter and the outer peripheral diameter of the disk 1.

Returning to FIG. 1, a chucking operation of the disk will be described.

When the arm 4 is lowered by a predetermined amount in the Z direction after the arm 4 is positioned in a predetermined position in the X, Y and Z directions with respect to the disk cassette 8 by the handling robot 9, the finger 32 is inserted into an empty space 8a in a rear portion of the disk cassette 8. Then, when the air cylinder 31 is moved forward and the movable table 31b is moved forward, the first finger 32a and the second finger 32b are lowered, so that the rollers 33a and 33b of the first finger 32a engage with the outer periphery as shown in FIG. 2. On the other hand, the bracket link 34 is rotated with the forward movement of the movable table 31b and the roller 33c fixed to the bracket link 34 is rotated and protrudes in a horizontal direction. Therefore, the roller 33c engages with the inner periphery of the disk 1 as shown in FIG. 2, so that the disk 1 is chucked at three points. The disk 1 thus chucked is taken from the cassette 8 when the arm 4 is moved up. When a disk 1 is to be stored in the cassette 8, the disk 1 chucked is stored in the cassette 8 and the chucking operation is released.

The protrusion of the roller 33c is realized by lowering the second finger 32b with respect to the third finger 32c. Since the third finger 32c is fixed, the bracket link 34 is rotated clockwise by 90° when the second finger 32b is lowered, so that the roller 33c is raised in a horizontal direction.

When the roller 33c is protruded and engages with the inner periphery of the disk 1, the roller 33c does not rotate any more. In such a state, the roller 33c is stopped at a position according to a balance of the relation between the weight and rotating direction of the disk 1. In this case, the rollers 33a and 33b do not engage with the outer periphery of the disk 1 as yet. In this case, the rotation of the bracket link 34 together with the roller 33c is stopped. Therefore, the leaf spring 32d is bent when the first finger 32a is further lowered. This will be described in detail.

When the weight of the disk 1 is, for example, from 10 grams to ten-odd grams, the leaf spring 32d starts to bend correspondingly to the weight of the disk 1 since the roller 33c is rotated clockwise and engages with the inner periphery of the disk 1. When the first finger 32a is further lowered, the leaf spring 32d is bent further to push up the disk 1 and the roller 33c is stopped in the vicinity of the horizontal position when the rollers 33a and 33b are in the positions shown by dotted lines shown in FIG. 2. When the roller 33c is further rotated clockwise from the horizontal position, the vertical pushing-up force component is reduced. Therefore, the roller 33c is stopped at a horizontal position or a position in which the disk 1 is pushed up slightly from the horizontal position in balance of the weight of the disk 1 and the rotation of the bracket link 34 is stopped with the stoppage of the roller 33c. Further, it is possible to select the repulsive force of the leaf spring 32d. When the first finger 32a is further lowered, the rollers 33a and 33b are lowered from the position shown by dotted lines in FIG. 2 to allow a further bending of the leaf spring 32d. The bending of the leaf spring 32d is stopped at a time point when the rollers 33a and 33b engage with the outer periphery of the disk 1. At that time, the position of the disk 1 lifted up from the horizontal position can be returned to the state shown in FIG. 2.

That is, until the rollers 33a and 33b of the first finger 32a engage with the outer periphery of the disk 1, the second finger 32b can be lowered. By the lowering of the rollers 33a and 33b from the position shown by the dotted line in FIG. 2, the rollers 33a and 33b approach the position shown by a solid line in FIG. 2 and the U-shaped leaf spring 32d is bent in a compression direction. The thus bent leaf spring 32d energizes the bracket link 34 to further rotate it in the clockwise direction.

The energizing force of the leaf spring 32d is increased with lowering of the rollers 33a and 33b and a force for further rotating the bracket link 34 clockwise even when the roller 33c is stopped is applied to the inner periphery of the disk 1. The energizing force of the leaf spring 32d moves the rollers 33a and 33b from the position shown by the dotted line to the position shown by the solid line.

Thus, the rollers 33a and 33b of the first finger 32a are engaged with the outer periphery of the disk 1 when a predetermined force is applied to the inner periphery of the disk 1. At this time, a further lowering of the second finger 32b is stopped. Therefore, it becomes possible to chuck the disk 1 with the predetermined force generated by the U-shaped leaf spring 32d by only the forward drive of the actuator 31.

As a result, it is possible to increase the drive speed of the air cylinder 31. Incidentally, when the weight of the disk 1 is several hundreds of grams, the energizing force can be increased by increasing the repulsive force of the leaf spring 32d.

The chucking force in such a case substantially corresponds to a lowering difference Δd (refer to FIG. 2) between the third finger 32c and the first finger 32a after the roller 33c engages with the inner periphery of the disk 1 by the protrusion of the roller 33c, that is, the distance from the dotted line to the solid line of the rollers 33a and 33b. The lowering difference Δd is determined by the repulsive force (elastic force) of the U-shaped leaf spring 32d and the bending amount thereof, and can be a constant force.

Since the lowering of the first finger 32a is stopped when the rollers 33a and 33b of the first finger 32a engage with the outer periphery of the disk 1, the amount of lowering (Δd) is restricted to a constant amount. Therefore, it is easy to set the chucking force with respect to the disk in a range from several tens of grams to several hundreds of grams by selecting the repulsive force (elastic force) and the bending amount of the leaf spring 32d.

Incidentally, the release of the disk 1 is performed by driving the air cylinder 31 rearward and lifting up the movable table 31b.

In this embodiment, the V-grooved roller on the inner periphery chucking side is swingable. However, it is possible to make the V-grooved roller on the outer periphery chucking side swingable. In such case, the swinging direction is counterclockwise. Therefore, the disk 1 is chucked by the rearward drive of the actuator. It is possible to chuck the disk 1 with a predetermined force by only the rearward drive.

Such a mechanism can be realized by exchanging the positions of the roller 33c and the rollers 33a and 33b.

The finger 32a in FIG. 2 is positioned in the vicinity of the inner periphery of the disk 1 by using longer fingers. The rollers 33a and 33b chuck the inner periphery of the disk 1 by protruding these rollers. In such case, the second finger 32b chucks the outer periphery of the disk 1 by positioning the roller 33c and the bracket link 34 in an upper portion of the outer periphery of the disk 1 by using a shorter second finger 32b.

Thus, the roller 33c is positioned in the outer periphery of the disk 1 and the rollers 33a and 33b are positioned on the inner periphery side of the disk 1, such that the position of the roller 33c and the positions of the rollers 33a and 33b are reversed.

The movable table 31b rotates the bracket link 34, which is moved rearward and positioned on the outer periphery side, counterclockwise.

Therefore, the roller 33c engages with the outer periphery of the disk 1 and the rollers 33a and 33b engage with the inner periphery of the disk 1 by lifting up and bending the leaf spring 32d.

Incidentally, the rollers 33a and 33b can protrude toward the inner periphery of the disk 1 by moving the arm 4 along the cassette 8.

Figure 4:
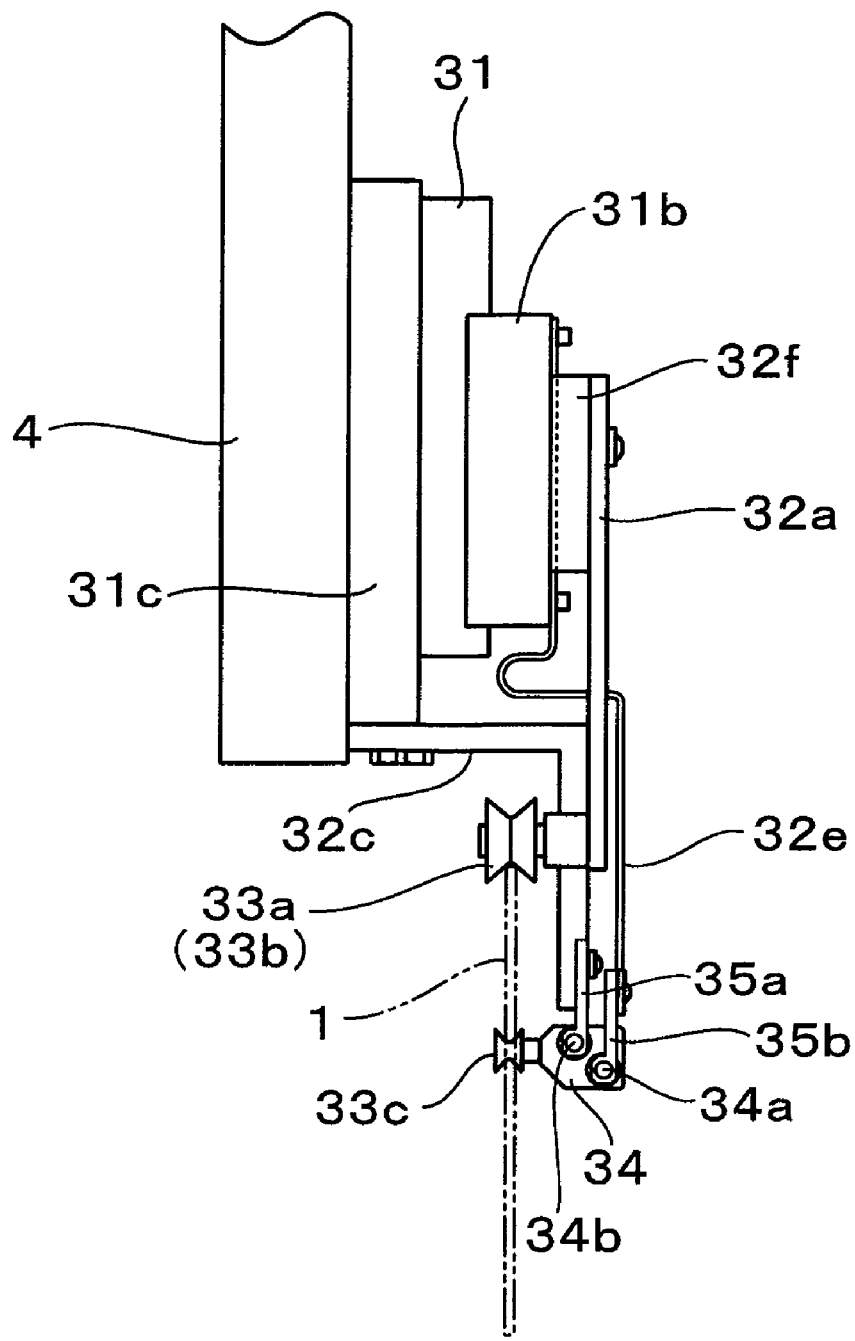
FIG. 4 shows another embodiment of this invention.

FIG. 4 shows another embodiment of this invention, in which the second finger 32b in the embodiment shown in FIG. 1 is replaced by a second finger 32e which is united with the U-shaped leaf spring 32d.

Therefore, the second finger 32e is constructed as a single leaf spring and one end portion of the leaf spring is fixed to the movable table 31b. The other end portion of the second leaf spring 32e is coupled to the bracket link 34 through a link coupling metal ware 35b. Thus, the structure of the second finger 32e becomes simpler than that shown in FIG. 1. Incidentally, the top end of the third finger 32c is coupled to the bracket link 34 through a link coupling metal ware 35a similarly to the embodiment shown in FIG. 3(b).

As shown, the second finger 32e is bent inside. The first finger 32a, which includes the rollers 33a and 33b, is fixed to the movable table 31b through a pedestal 32f. The length of the third finger 32c is shorter than that shown in FIG. 1.

Since other constructions are substantially similar to those shown in FIG. 1, the descriptions thereof are omitted.

Since the disk chucking mechanism having such a structure can be made compact, it is effective for disks having outer diameter not larger than 1.8 inches.

The roller 33c takes the form of a chucking nail for chucking the disk. This chucking nail protrudes in a left side direction perpendicular to the longitudinal direction of the third finger 32c of the embodiment shown in FIG. 1.

The chucking nail may protrude in a right side direction perpendicularly to the longitude direction of the second finger 32b. In such case, it is possible to take the disk 1 from the opposite side of the cassette 8 in FIG. 1 and the roller 33c is mounted on the bracket link 34 by moving the position of the bracket link 34 from the left side to the right side in FIG. 4 such that it protrudes on the right side in FIG. 4 and the rollers 33a and 33b are mounted on the top end of the first finger 32a by moving the positions of the rollers 33a and 33b from the left side to the right side such that these rollers protrude on the right side. The positions of the second finger 32e and the third finger 32c are switched.

Further, in FIG. 2 or in FIG. 4 the positions of the second finger 32b (the second finger 32e) and the third finger 32c may be switched by fixing the second finger 32b (the second finger 32e) to the fixed base 31c through the spring member 32d and mounting the third finger 32c on the moving table 31b on the fixing side. And, the third finger 32c is moved forward and rearward. Thus, the second finger 32b (the second finger 32e) on the fixing side having the spring member 32d is moved relatively to the third finger 32c.

In the embodiment shown in FIG. 1, the outer periphery chucking is performed at two points by using two V-grooved rollers. However, in this invention, it is possible to use one V-grooved roller for the periphery chucking and to chuck the disk 1 at two opposing points on the inner and outer peripheries. Further, it is possible to use a chucking nail having other configurations in lieu of the V-grooved roller.

Further, this invention can be applied to a chucking mechanism for chucking a disk at three outer peripheral points of the disk by moving the V-grooved roller of the inner periphery shown in FIG. 1 to the outer periphery chucking.

Further, the leaf spring provided on the second finger 32b in the embodiments may be such as a coil spring.

Further, though the disk chucking is described mainly when the disk 1 is taken from the cassette 8, the disk chucking mechanism of this invention can be applied to a case where the disk 1 is stored in the cassette 8 by reversing the described operation. Further, the disk chucking mechanism of this invention can be applied to the storing of the disk in and the taking of the disk out from other locations than the cassette.

The invention claimed is:

1. A disk chucking mechanism for chucking a disk having a center hole by engaging an inner periphery or an outer periphery of the disk, comprising:
    a forward/rearward actuator;
    a first link member,
    a second link member arranged along a longitudinal direction of said first link member and movable forwardly or rearwardly relatively along the longitudinal direction of said first link member,
    a third link member linked with end portions of said first and second link members,
    a first chucking nail provided on said third link member and rotatable according to rotation of said third link member, and
    a spring member provided on said second link member and bendable according to the forward or the rearward movement,
    wherein said third link member is rotated by moving said second link member forwardly or rearwardly to protrude said first chucking nail in a direction perpendicular to the longitudinal direction of one of said first and second link members such that said nail engages with an inner or outer periphery of said disk and to generate an energizing force for further rotating said third link member by bending said spring member.

2. A disk chucking mechanism claimed in claim 1, wherein said first link member is fixed to a frame or an arm, said second link member is moved by said forward/rearward actuator through said spring member, the rotation of said third link member is stopped by an engagement of said first chucking nail and said disk and said spring member is bent such that the energizing force is generated according to the forward or rearward movement after the stoppage of rotation.

3. A disk chucking mechanism as claimed in claim 2, wherein said spring member is provided between an end portion of said second link member opposite to an end portion of said second link member which is linked and said forward/rearward actuator and said first chucking nail is fixed to said third link member and extends downwardly.

4. A disk chucking mechanism as claimed in claim 3, wherein said forward/rearward actuator includes a rod member movable forward/rearward along said first link member, a second chucking nail is provided on said rod member, said first chucking nail engages with one of an inner and outer peripheries of said disk, said second chucking nail engages with the other one of said inner and outer peripheries of said disk, and the bending of said spring member is stopped when said second chucking nail engages with the other one of said inner and outer peripheries of said disk.

5. A disk chucking mechanism as claimed in claim 4, wherein said forward/rearward actuator is an air cylinder, said first and second chucking nails are V-grooved rollers, said disk is stored in a cassette, said second link member is driven forwardly toward said cassette by drive of said forward/rearward actuator and said disk is chucked by a predetermined chucking force by said first and second nails.

6. A disk chucking mechanism as claimed in claim 4, wherein said second chucking nail is fixed to said rod member such that said second chucking nail protrudes perpendicularly to a longitudinal direction of said rod member, said spring member is a bent leaf spring and provided between said rod member and the opposite end portion of said second link member, said second chucking nail engages with the outer periphery of said disk by a movement of said rod member to said disk by the forward movement.

7. A disk chucking mechanism as claimed in claim 6, wherein two said second chucking nails are provided and said first chucking nail and said two second chucking nails chuck said disk at three points of an inner or outer peripheries of said disk.

8. A disk chucking mechanism as claimed in claim 2, wherein said spring member is fixed to a movable table of said forward/rearward actuator and said second link member is constructed with a spring member by uniting said spring member except the end portion coupled with said third link member.

9. A disk handling robot having the disk chucking mechanism as claimed in claim 1.

* * * * *